(12) United States Patent
Nagano

(10) Patent No.: US 12,041,463 B2
(45) Date of Patent: Jul. 16, 2024

(54) CONTROL SYSTEM, RELAY DEVICE, CONTROL DEVICE, CONTROL METHOD, AND NON-TRANSITORY COMPUTER-READABLE MEDIUM

(71) Applicant: NEC Corporation, Tokyo (JP)

(72) Inventor: Hiroaki Nagano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 372 days.

(21) Appl. No.: 17/436,333

(22) PCT Filed: Jan. 21, 2020

(86) PCT No.: PCT/JP2020/001899
§ 371 (c)(1),
(2) Date: Sep. 3, 2021

(87) PCT Pub. No.: WO2020/188991
PCT Pub. Date: Sep. 24, 2020

(65) Prior Publication Data
US 2022/0174506 A1 Jun. 2, 2022

(30) Foreign Application Priority Data
Mar. 20, 2019 (JP) .................. 2019-052505

(51) Int. Cl.
*H04W 16/26* (2009.01)
*H04W 88/06* (2009.01)

(52) U.S. Cl.
CPC ............ *H04W 16/26* (2013.01); *H04W 88/06* (2013.01)

(58) Field of Classification Search
CPC . H04W 16/26; H04W 76/22; H04W 28/0252; H04W 76/15; H04W 28/0268; H04B 7/15528; H04L 47/2475
See application file for complete search history.

(56) References Cited

U.S. PATENT DOCUMENTS

| 2010/0014475 A1 | 1/2010 | Horiuchi et al. |
| 2010/0128622 A1 | 5/2010 | Horiuchi et al. |

(Continued)

FOREIGN PATENT DOCUMENTS

| CN | 103139882 A | 6/2013 |
| CN | 104143857 A | 11/2014 |

(Continued)

OTHER PUBLICATIONS

International Search Report for PCT Application No. PCT/JP2020/001899, mailed on Feb. 18, 2020.

(Continued)

*Primary Examiner* — Anez C Ebrahim
(74) *Attorney, Agent, or Firm* — Sughrue Mion, PLLC

(57) ABSTRACT

In a relay device (20), a prediction unit (24) predicts an overall communication characteristic of a planned switching set selected by a communication control unit (23). A notification unit (25) notifies a control device (10) of a notification signal including a prediction communication characteristic predicted by the prediction unit (24). In the control device (10), a control unit (11) performs control for a device to be controlled (30) based on a "control parameter value." A change unit (12) changes the control parameter value used by the control unit (11) based on the prediction communication characteristic notified from the relay device (20).

11 Claims, 7 Drawing Sheets

(56) References Cited

U.S. PATENT DOCUMENTS

2016/0315879 A1* 10/2016 Morris .................... H04L 49/70
2018/0199221 A1*  7/2018 Lin ....................... H04L 47/822
2019/0190848 A1*  6/2019 Zavesky ................ H04L 47/83

FOREIGN PATENT DOCUMENTS

JP          2017-050797 A        3/2017
JP          2018-142906 A        9/2018

OTHER PUBLICATIONS

Extended European Search Report for EP Application No. EP20773487.2 dated on May 3, 2022.
CN Office Action for CN Application No. 202080021399.5, mailed on Dec. 23, 2023 with English Translation.

* cited by examiner

CONTROL SYSTEM, RELAY DEVICE, CONTROL DEVICE, CONTROL METHOD, AND NON-TRANSITORY COMPUTER-READABLE MEDIUM This application is a National Stage Entry of PCT/JP2020/001899 filed on Jan. 21, 2020, which claims priority from Japanese Patent Application 2019-052505 filed on Mar. 20, 2019, the contents of all of which are incorporated herein by reference, in their entirety.

TECHNICAL FIELD

The present disclosure relates to a control system, a relay device, a control device, a control method, and a control program.

BACKGROUND ART

A technique in which a control device remotely controls a device to be controlled has been proposed (for example, Patent Literature 1). A communication system disclosed in Patent Literature 1 includes a controller (control device), an access point (relay device), and a movable device (device to be controlled). In the communication system, when communication quality between the movable device and the access point deteriorates, the movable device autonomously issues an alert to the controller or performs autonomous control.

CITATION LIST

Patent Literature

Patent Literature 1: Japanese Unexamined Patent Application Publication No. 2017-50797

SUMMARY OF INVENTION

Technical Problem

The inventor has found that communication between a relay device and a device to be controlled can be stabilized, by first providing the relay device with a plurality of communication units that differ from each other in at least one of a communication method and a communication channel, and making the relay device autonomously switch a use set composed of some of the plurality of communication units according to switching policy. Furthermore, the inventor has found that although the communication between the relay device and the device to be controlled can be stabilized by the relay device autonomously switching the use set, the switching may change communication characteristics between the relay device and the device to be controlled, and the changes of the communication characteristics may affect control by the control device.

An objects of the present disclosure is to provide a control system, a relay device, a control device, a control method, and a control program that stabilize communication between a relay device and a device to be controlled and enable control to follow a change in a communication characteristic between the relay device and the device to be controlled.

Solution to Problem

A control system according to a first aspect is a control system configured to control a device to be controlled, the control system comprising:

a control device configured to control the device to be controlled by forming and transmitting a control signal for the device to be controlled; and
a relay device configured to transfer the transmitted control signal to the device to be controlled, wherein
the relay device includes:
a plurality of communication units that differ from each other in at least one of a communication method and a communication channel;
a communication control unit configured to select, when a current use set including some communication units among the plurality of communication units is being used to transfer the control signal, a planned switching set including some other communication units among the plurality of communication units from the plurality of communication units according to switching policy;
a prediction unit configured to predict a prediction communication characteristic of the planned switching set; and
a notification unit configured to notify the control device of the predicted prediction communication characteristic, and
the control device includes:
a control unit configured to perform control for the device to be controlled based on a control parameter value; and
a change unit configured to change the control parameter value based on the notified prediction communication characteristic.

A relay device according to a second aspect is a relay device configured to relay a control signal for a device to be controlled transmitted from a control device, the relay device comprising:
a plurality of communication units that differ from each other in at least one of a communication method and a communication channel;
a communication control unit configured to select, when a current use set including some communication units among the plurality of communication units is being used to transfer the control signal, a planned switching set including some other communication units among the plurality of communication units from the plurality of communication units according to switching policy;
a prediction unit configured to predict a prediction communication characteristic of the planned switching set; and
a notification unit configured to notify the control device of the predicted prediction communication characteristic.

A control device according to a third aspect is a control device configured to control a device to be controlled by forming and transmitting a control signal for the device to be controlled, wherein
the transmitted control signal is relayed by a relay device to the device to be controlled, wherein
the relay device includes a plurality of communication units that differ from each other in at least one of a communication method and a communication channel, a communication control unit configured to select, when a current use set including some communication units among the plurality of communication units is being used to transfer the control signal, a planned switching set including some other communication units among the plurality of communication units from the plurality of communication units according to switching policy, a prediction unit configured to predict a prediction communication characteristic of the planned switching set, and a notification unit configured to notify the control device of the predicted prediction communication characteristic, the control device comprising:

a control unit configured to perform control for the device to be controlled based on a control parameter value; and a change unit configured to change the control parameter value based on the notified prediction communication characteristic.

A control method according to a fourth aspect is a control method performed by a relay device configured to relay a control signal for a device to be controlled transmitted from a control device, the control method comprising:

when a current use set including some communication units among a plurality of communication units that differ from each other in at least one of a communication method and a communication channel is being used to transfer the control signal, selecting a planned switching set including some other communication units among the plurality of communication units from the plurality of communication units according to switching policy;

predicting a prediction communication characteristic of the planned switching set; and notifying the control device of the predicted prediction communication characteristic.

A control program according to a fifth aspect causes a relay device configured to relay a control signal for a device to be controlled transmitted from a control device to perform processes of when a current use set including some communication units among a plurality of communication units that differ from each other in at least one of a communication method and a communication channel is being used to transfer the control signal, selecting a planned switching set including some other communication units among the plurality of communication units from the plurality of communication units according to switching policy;

predicting a prediction communication characteristic of the planned switching set; and notifying the control device of the predicted prediction communication characteristic.

Advantageous Effects of Invention

According to the present disclosure, it is possible to provide the control system, a relay device, a control device, a control method, and a control program that stabilize communication between the relay device and the device to be controlled and enable control to follow a change in a communication characteristic between the relay device and the device to be controlled.

DESCRIPTION OF EMBODIMENTS

Hereinafter, example embodiments will be described with reference to the drawings. In the example embodiments, the same or equivalent elements are assigned the same reference signs and duplicate description is omitted.

First Example Embodiment

Outline of Control System

Figure 1:
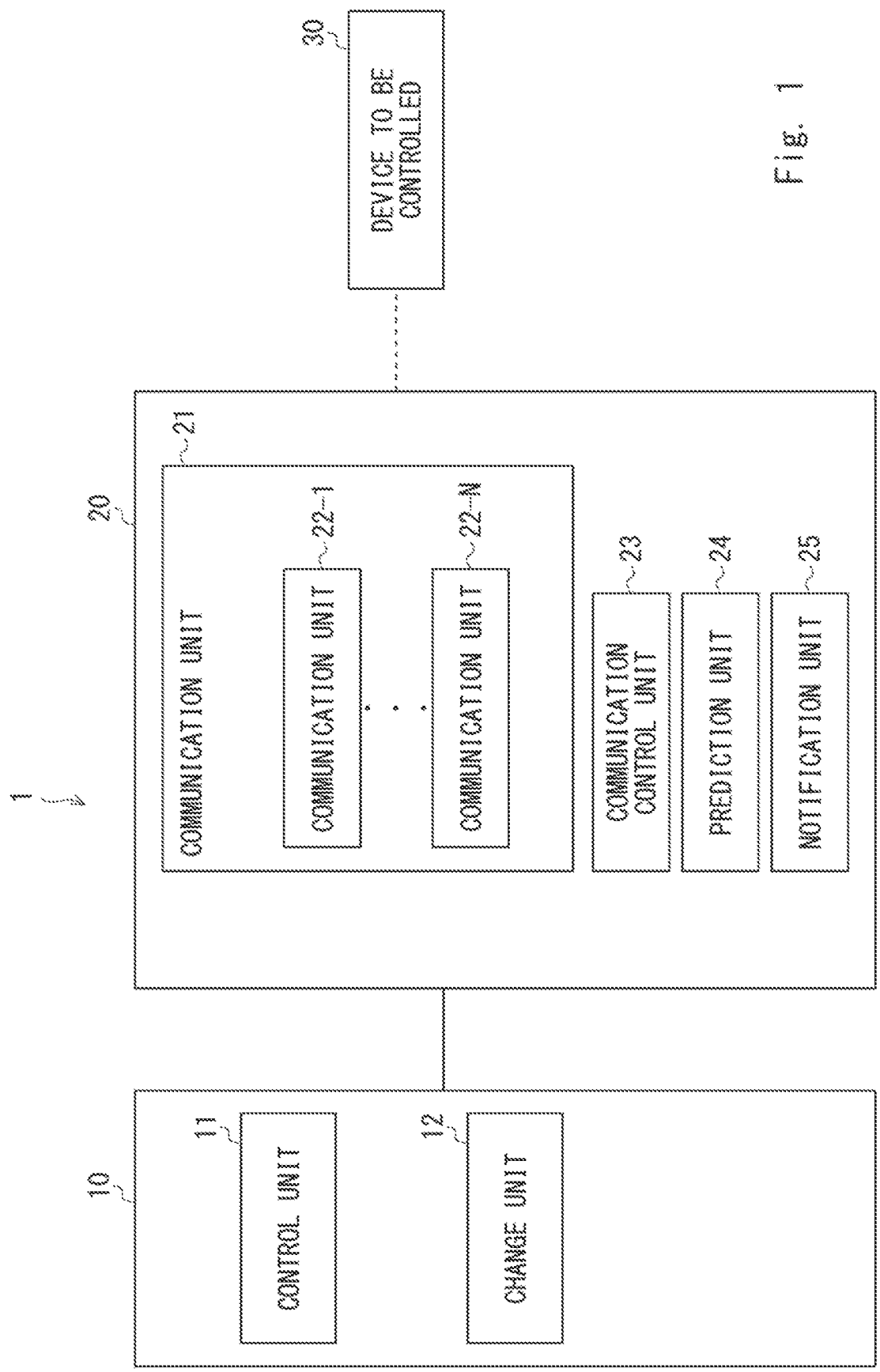
FIG. 1 is a block diagram showing an example of a control system in a first example embodiment.

FIG. 1 is a block diagram showing an example of a control system in a first example embodiment. In FIG. 1, a control system 1 includes a control device 10, a relay device 20, and a device to be controlled 30. The control device 10 and the relay device 20 are connected to each other by wire, for example, via a network. The relay device 20 and the device to be controlled 30 can be wirelessly connected to each other. In FIG. 1, connection between the control device 10 and the relay device 20 is represented by a solid line, and the connection between the relay device 20 and the device to be controlled 30 is represented by a dotted line.

The control device 10 is a device configured to control the device to be controlled 30 by forming and transmitting a control signal for the device to be controlled 30. The relay device 20 receives the control signal transmitted from the control device 10, and transfers the received control signal to the device to be controlled 30.

Configuration Example of Relay Device

As shown in FIG. 1, the relay device 20 includes a communication unit 21, a communication control unit 23, a prediction unit 24, and a notification unit 25.

The communication unit 21 includes communication units (wireless modules) 22-1 to 22-N (N is a natural number of two or more) that differ from each other in at least one of a communication method and a communication channel. Hereinafter, when the communication units 22-1 to 22-N are not distinguished, the communication units 22-1 to 22-N may be simply referred to as communication units 22. The communication units 22-1 to 22-N form a "use set" by some of the communication units 22-1 to 22-N by communication control by the communication control unit 23. A plurality of communication units 22 included in the "use set" will be actually used to transfer (wirelessly transmit) the control signal to the device to be controlled 30. Communication methods of the communication units 22-1 to 22-N may include at least one of a wireless LAN communication method, an LTE (Long Term Evolution) communication method, and a fifth generation (5G) communication method. Each communication unit (wireless module) 22 may be a wireless module integrated in the relay device 20, or may be an external wireless access point, a slave unit, or a wireless converter.

When the "current use set" including some communication units 22 among the plurality of communication units 22 is being used to transfer the control signal, the communication control unit 23 selects a "planned switching set" including some other communication units 22 among the plurality of communication units 22 from the plurality of communication units 22 according to "switching policy." The "switching policy" may be, for example, policy of selecting a combination of communication units 22 which are difficult to disconnect communication between the communication unit 21 and the device to be controlled 30 (that is, the "planned switching set) regardless of a communication characteristic (for example, communication delay). According to the switching policy, for example, even if traffic being transmitted by a communication unit 22 is high, as long as a propagation characteristic between the communication unit 22 and the device to be controlled 30 is good, the communication unit 22 may be included in the planned switching set. That is, the relay device 20 autonomously switches the use set independently of the control device 10. On the other hand, the relay device 20 notifies the device to be controlled 30 of the switching of the use set, and the relay device 20 and the device to be controlled 30 switch the use set at the same period.

The prediction unit 24 predicts an overall communication characteristic of the planned switching set selected by the communication control unit 23. Hereinafter, the predicted communication characteristic may be referred to as "prediction communication characteristic." The "prediction communication characteristic" is, for example, an expected value (average or maximum) of delay, failure occurrence probability expectancy, or throughput.

The notification unit 25 notifies the control device 10 of a notification signal including the prediction communication characteristic predicted by the prediction unit 24.

Configuration Example of Control Device

As shown in FIG. 1, the control device 10 includes a control unit 11 and a change unit 12.

The control unit 11 performs control for the device to be controlled 30 based on a "control parameter value."

The change unit 12 changes the control parameter value used by the control unit 11 based on the prediction communication characteristic notified from the relay device 20.

As described above, according to the first example embodiment, when the "current use set" including some communication units among the plurality of communication units 22 is being used to transfer the control signal in the relay device 20, the "planned switching set" including some other communication units 22 among the plurality of the communication units 22 is selected from the plurality of communication units 22 according to the "switching policy."

The configuration of the relay device 20 can stabilize communication between the relay device 20 and the device to be controlled 30.

In the relay device 20, the prediction unit 24 predicts the overall communication characteristic of the planned switching set selected by the communication control unit 23. The notification unit 25 notifies the control device 10 of the notification signal including the prediction communication characteristic predicted by the prediction unit 24.

The configuration of the relay device 20 enables control for the device to be controlled 30 by the control device 10, following a change in the communication characteristic between the relay device 20 and the device to be controlled 30.

Notification timing of the notification signal to the control device 10 by the relay device 20 may be the same time (same period) as switching timing from the current use set to the planned switching set by the relay device 20, or may be a certain time before the switching timing. In the latter case, the control device 10 is given a preparation time for performing control following a change in the communication characteristic.

In the control device 10, the control unit 11 performs control for the device to be controlled 30 based on the "control parameter value." The change unit 12 changes the control parameter value used by the control unit 11 based on the prediction communication characteristic notified from the relay device 20.

The configuration of the control device 10 enables control for the device to be controlled 30, following a change in the communication characteristic even when the change in the communication characteristic between the relay device 20 and the device to be controlled 30 due to switching of the above use set is discontinuous.

Second Example Embodiment

A second example embodiment relates to an example embodiment in which a control device changes control policy based on a notified prediction communication characteristic. Basic configurations of a relay device and a device to be controlled in the second example embodiment are the same as those of the relay device 20 and the device to be controlled 30 in the first example embodiment.

Figure 2:
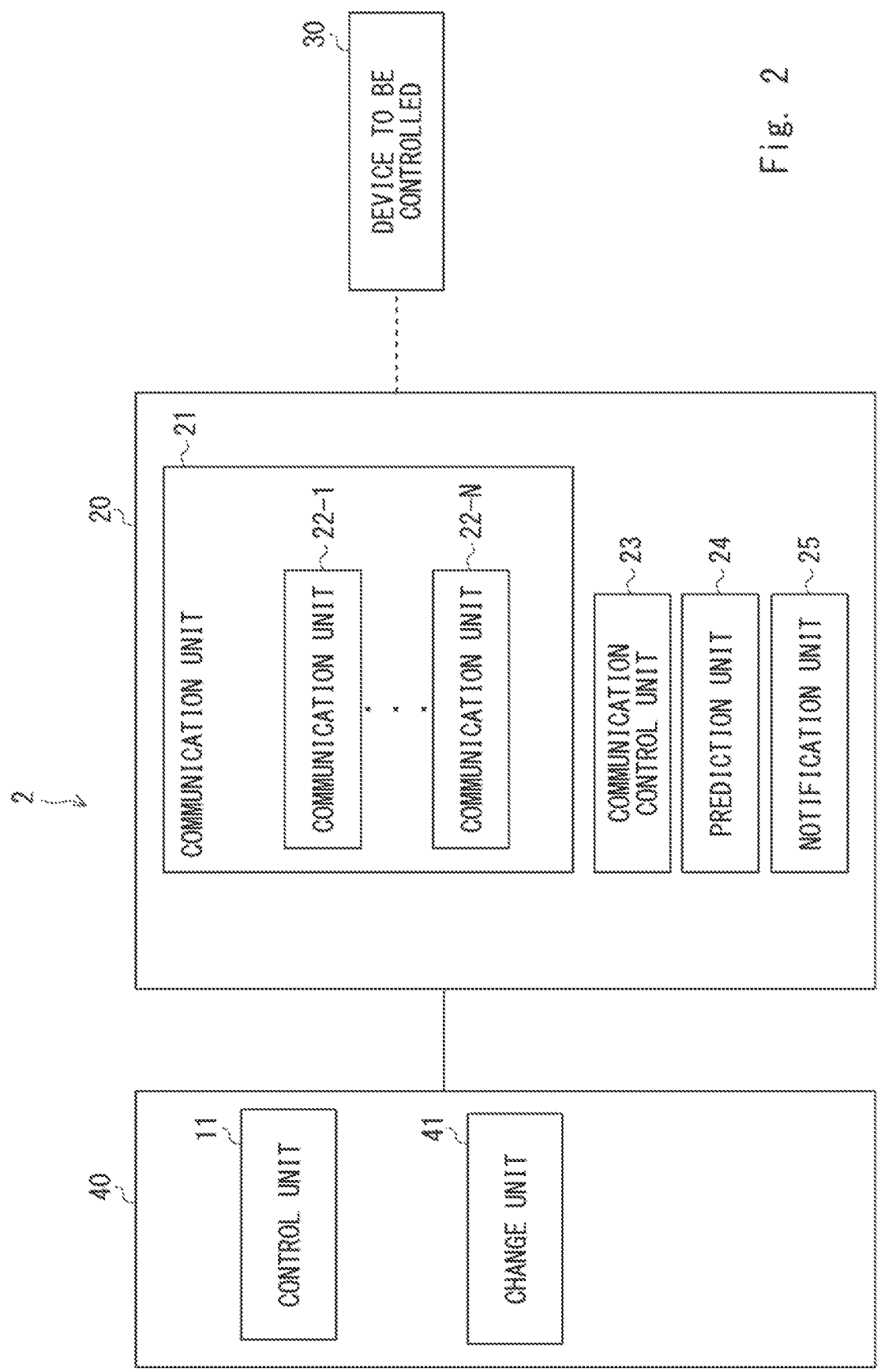
FIG. 2 is a block diagram showing an example of a control system in a second example embodiment.

FIG. 2 is a block diagram showing an example of a control system in the second example embodiment. In FIG. 2, a control system 2 includes a control device 40, a relay device 20, and a device to be controlled 30.

In the control device 40, a change unit 41 changes control policy including a change method of a control parameter value and a control method used by a control unit 11 based on the prediction communication characteristic notified from the relay device 20. The control unit 11 controls the device to be controlled 30 according to the control policy.

For example, when the prediction communication characteristic notified from the relay device 20 is low delay and high quality and there is almost no risk of communication shut-off, the change unit 41 may change the control policy to "high-speed control" that precisely adapts to situations while receiving real-time feedback from the device to be controlled 30. When magnitude of delay indicated by the prediction communication characteristic notified from the relay device 20 fluctuates in an allowable range, the change unit 41 may change a wasteful time element estimation parameter or the like on feedback control.

For example, when communication quality indicated by the prediction communication characteristic notified from the relay device 20 has a high failure probability and a risk of occurrence of communication shut-off cannot be ignored, the change unit 41 may change the control policy to control that allows the device to be controlled 30 to autonomously operate to some extent and ensure safety even at a time of communication shut-off.

For example, when the prediction communication characteristic notified from the relay device 20 is high delay, the change unit 41 may change the control policy to control that only exchanges operation results without requiring feedback of open-loop control, by giving a series of operation instructions to the device to be controlled 30 and making the device to be controlled 30 operate according to the series of operation instructions.

Such a change of the control policy enables a quick and appropriate change of the control method and a parameter even when the communication unit 21 receives external interference or the like and the communication characteristic suddenly changes due to a change of a used communication unit 22.

Third Example Embodiment

A third example embodiment relates to an example embodiment in which a relay device notifies a control device of not only a prediction communication characteristic but also a "current communication characteristic," and the control device uses both prediction communication characteristic and current communication characteristic to perform control for a device to be controlled.

Figure 3:
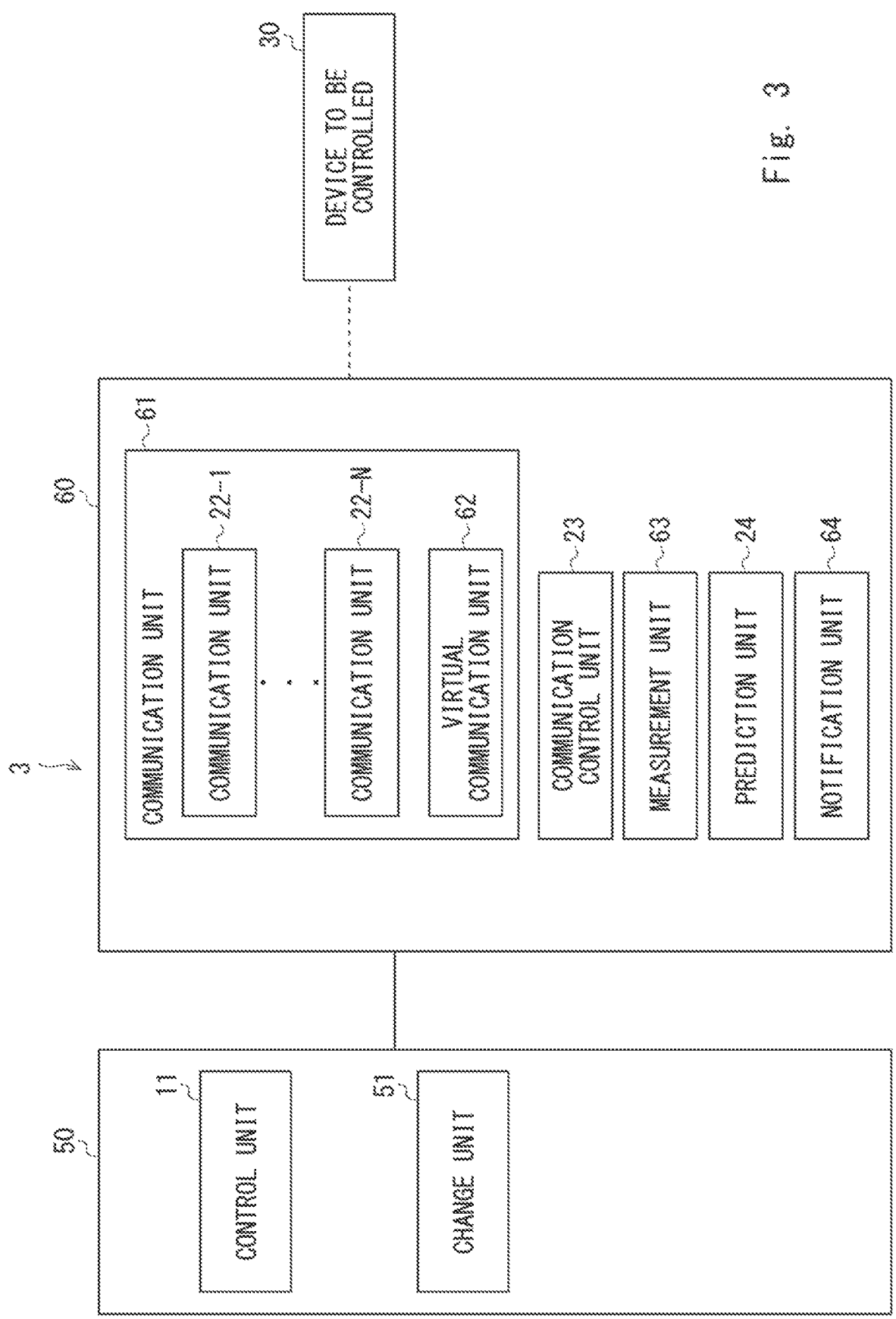
FIG. 3 is a block diagram showing an example of a control system in a third example embodiment.

FIG. 3 is a block diagram showing an example of a control system in the third example embodiment. In FIG. 3, a control system 3 includes a control device 50, a relay device 60, and a device to be controlled 30.

As shown in FIG. 3, the relay device 60 includes a communication unit 61, a measurement unit 63, and a notification unit 64.

The communication unit 61 includes communication units 22-1 to 22-N and a virtual communication unit 62. The virtual communication unit 62 uses a "virtual MAC address" that bundles the communication units 22-1 to 22-N to establish a link with the device to be controlled 30. For example, the virtual communication unit 62 attaches the virtual MAC address as a header to a control signal received from the control device 10, and outputs the control signal with the virtual MAC address to communication units 22 included in a "use set." The communication units 22 that have received the control signal with the virtual MAC address set the control signal with the virtual MAC address as a payload and attach their own MAC address (that is, a real MAC address) to the payload. Then, the communication units 22 wirelessly transmit the control signal with the real MAC address and the virtual MAC address to the device to be controlled 30. This allows communication to be performed between the virtual communication unit 62 of the relay device 60 and a virtual communication unit (not shown) of the device to be controlled 30 without being aware of a combination of the communication units 22 included in the use set.

The measurement unit 63 measures an overall communication characteristic (that is, a "current communication characteristic") of a currently-used "use set (that is, a "current use set")."

The notification unit 64 notifies the control device 50 of a notification signal including a prediction communication characteristic predicted by a prediction unit 24 and the current communication characteristic measured by the measurement unit 63.

As shown in FIG. 3, the control device 50 includes a change unit 51. The change unit 51 changes a control parameter value used by a control unit 11 based on the prediction communication characteristic and the current communication characteristic notified from the relay device 60. For example, the change unit 51 calculates a difference between the prediction communication characteristic and the current communication characteristic, and may switch control policy including a change method of the control parameter value and a control method used by the control unit 11 depending on whether the calculated difference is larger than a threshold value or the calculated difference is equal to or less than the threshold value.

As described above, according to the third example embodiment, the control device 50 calculates a difference between the prediction communication characteristic and the current communication characteristic notified from the relay device 60, and switches the control policy including the change method of the control parameter value and the control method used by the control unit 11 depending on whether the calculated difference is larger than the threshold value or the calculated difference is equal to or less than the threshold value.

The configuration of the control device 50 enables quick and appropriate changes of the control method and a parameter even when the prediction communication characteristic suddenly fluctuates based on the current communication characteristic.

Fourth Example Embodiment

A fourth example embodiment relates to an example embodiment in which a relay device notifies a plan to switch from a current use set to a planned switching set within a certain time, and a control device that has received the notification transmits an instruction signal of advisability of the switching or switching execution timing to the relay device. Although a technique of the fourth example embodiment can be applied to any of the above-described first example embodiment to third example embodiment, in the following, as an example, a case where the technique is applied to the first example embodiment will be described.

Figure 4:
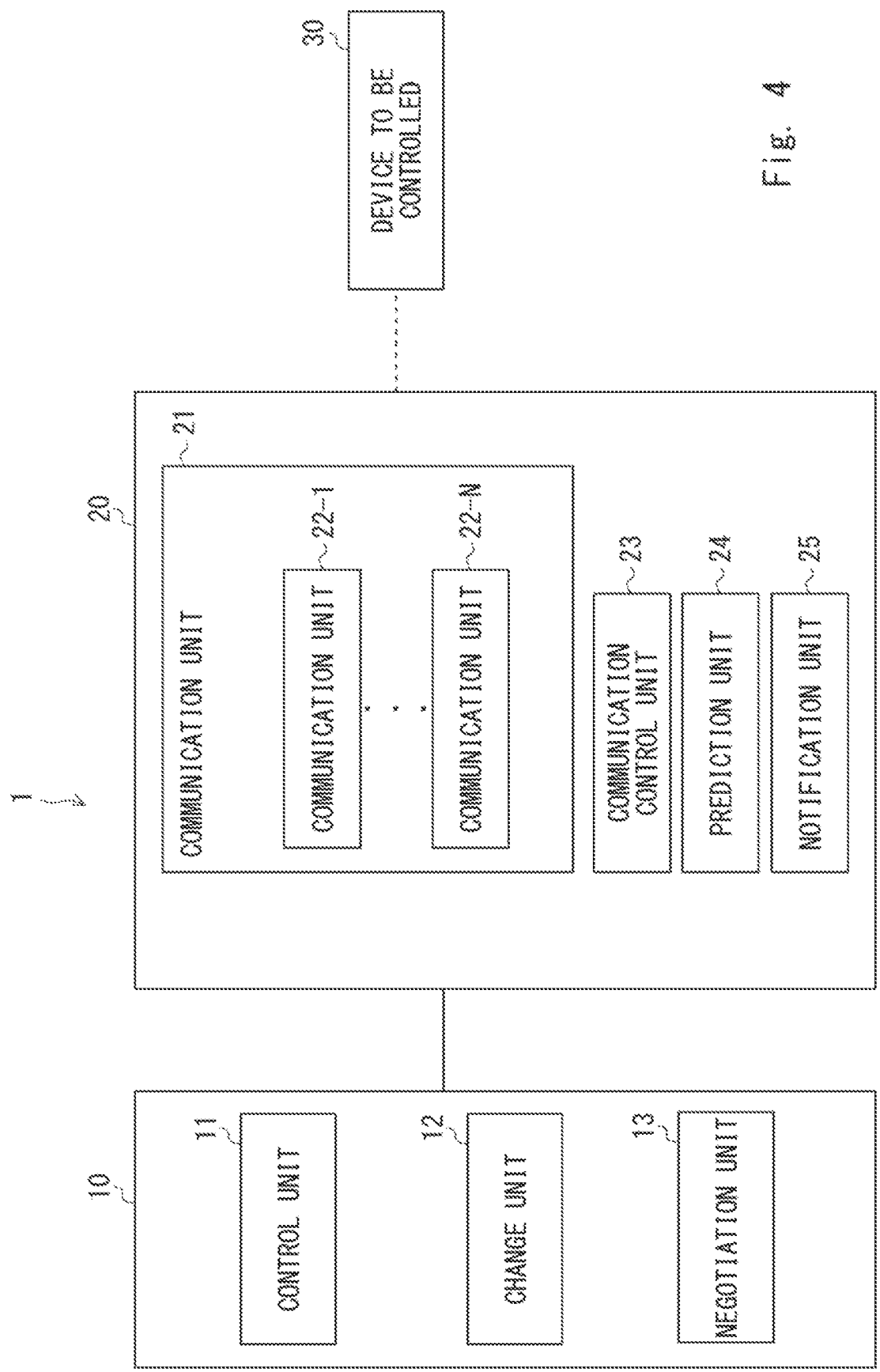
FIG. 4 is a block diagram showing an example of a control system in a fourth example embodiment.

FIG. 4 is a block diagram showing an example of a control system in the fourth example embodiment. As shown in FIG. 4, a control device 10 in the fourth example embodiment includes a negotiation unit 13.

A notification unit 25 of a relay device 20 in the fourth example embodiment notifies the control device 10 of a notification signal including information indicating "scheduled switching timing" in addition to a prediction communication characteristic predicted by a prediction unit 24. The "scheduled switching timing" is scheduled timing to switch from the current use set to the planned switching set.

The negotiation unit 13 of the control device 10 in the fourth example embodiment transmits an "instruction signal" including information indicating the advisability of the switching from the current use set to the planned switching set in the relay device 20 and the "switching execution timing" when the switching is advisable to the relay device 20.

A communication control unit 23 of the relay device 20 in the fourth example embodiment avoids switching from the current use set to the planned switching set when the instruction signal received from the control device 10 includes information indicating that the switching is inadvisable. The communication control unit 23 executes switching in accordance with switching execution timing, when the instruction signal received from the control device 10 includes information indicating switching and information indicating the switching execution timing.

Fifth Example Embodiment

A fifth example embodiment relates to variations in configurations of control systems.

Figure 5:
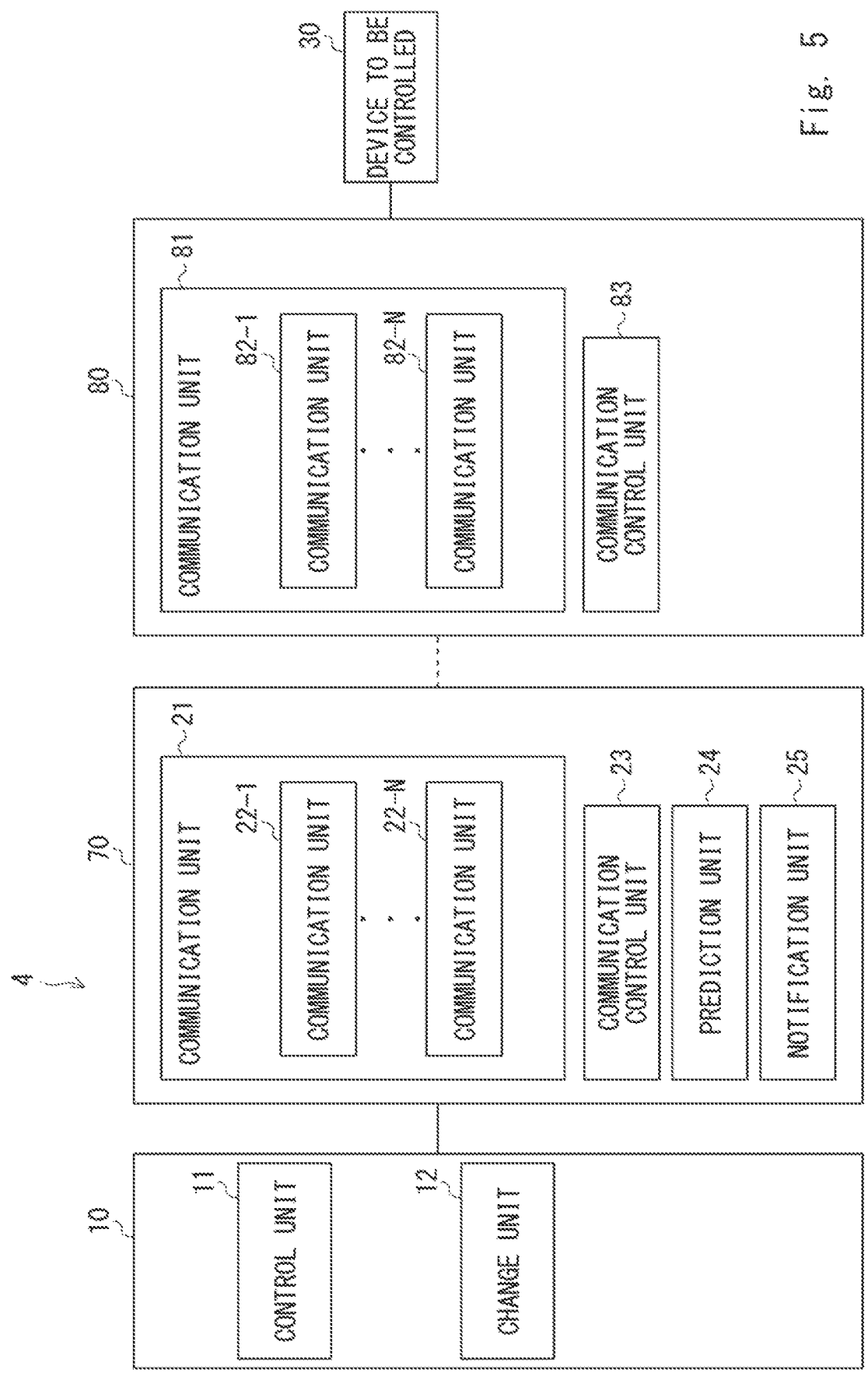
FIG. 5 is a block diagram showing an example of a control system in a fifth example embodiment.

FIG. 5 is a block diagram showing an example of a control system in a fifth example embodiment. In FIG. 5, a control system 4 includes a control device 10, reliable communication devices 70 and 80, and a device to be controlled 30. That is, the configuration of the control system 4 shown in FIG. 5 is a variation of the configuration of the control system 1 of the first example embodiment. Because of that, in FIG. 5, the reliable communication device 70 has a configuration equivalent to the relay device 20 of the first example embodiment. If it is a variation of the configuration of the control system 2 of the second example embodiment, the control system 4 includes the control device 40 and the reliable communication device 70 may have a configuration equivalent to the relay device 20 of the second example embodiment. In the same manner, if it is a variation of the configuration of the control system 3 of the third example embodiment, the control system 4 includes the control device 50 and the reliable communication device 70 may have a configuration equivalent to the relay device 60 of the second example embodiment. In the same manner, if it is a variation of the configuration of the control system 1 of the fourth example embodiment, the control system 4 includes the control device 20 and the reliable communication device 70 may have a configuration equivalent to the relay device 20 of the fourth example embodiment.

In FIG. 5, the reliable communication device 70 is shown as a device that is connected to the control device 10 and independent of the control device 10, but not limited to this, and the reliable communication device 70 may be integrated in the control device 10. In addition, in FIG. 5, the reliable communication device 80 is shown as a device that is connected to the device to be controlled 30 and independent of the device to be controlled 30, but not limited to this, and the reliable communication device 80 may be integrated in the device to be controlled 30.

In FIG. 5, the reliable communication device 80 includes a communication unit 81 and a communication control unit 83.

The communication unit 81 includes communication units (wireless modules) 82-1 to 82-N (N is a natural number of two or more) that differ from each other in at least one of communication a method and a communication channel. The communication units 82-1 to 82-N correspond to the communication units (wireless modules) 22-1 to 22-N of the reliable communication device 70, respectively. Each communication unit (wireless module) 82 may be a wireless module integrated in the reliable communication device 80, or may be an external wireless access point, a slave unit, or a wireless converter.

The communication control unit 83 performs control to switch a use set in the reliable communication device 80 in accordance with switching of a use set in the reliable communication device 70.

OTHER EXAMPLE EMBODIMENTS

Figure 6:
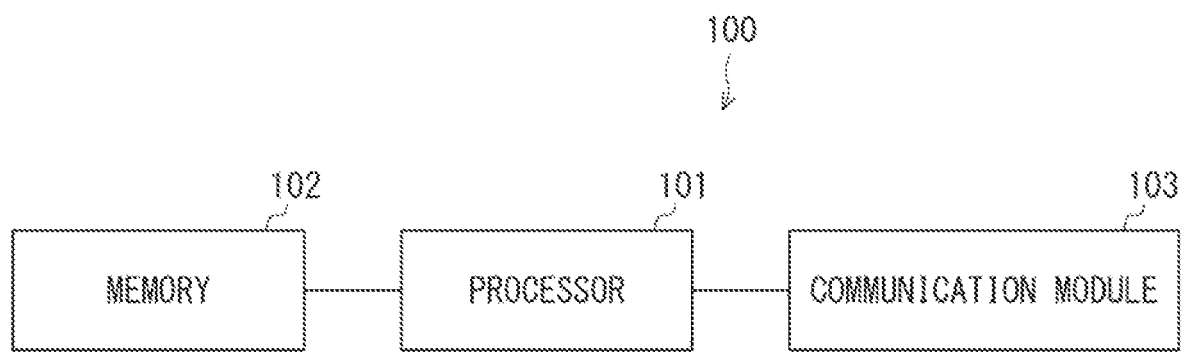
FIG. 6 is a diagram showing a hardware configuration example of a relay device.

FIG. 6 is a diagram showing a hardware configuration example of a relay device. In FIG. 6, a relay device 100 includes a processor 101, a memory 102, and a communication module 103. The processor 101 may be, for example, a microprocessor, an MPU (Micro Processing Unit), or a CPU (Central Processing Unit). The processor 101 may include a plurality of processors. The memory 102 is composed of a combination of a volatile memory and a nonvolatile memory. The memory 102 may include a storage disposed away from the processor 101. In this case, the processor 101 may access the memory 102 via an I/O interface (not shown). Although showing is omitted in FIG. 6, the relay device 100 includes a communication interface (not shown) for communicating with the control device.

The relay devices 20 and 60 of the first example embodiment to the fourth example embodiment can each have a hardware configuration shown in FIG. 6. The communication control unit 23, prediction unit 24, notification units 25 and 64, and measurement unit 63 of the relay devices 20 and 60 of the first example embodiment to the fourth example embodiment may be implemented by the processor 101 reading and executing a program stored in the memory 102. The communication units 21 and 61 of the relay devices 20 and 60 of the first example embodiment to the fourth example embodiment may be implemented by the communication module 103. The program can be stored using various types of non-transitory computer-readable media and supplied to the relay devices 20 and 60. Examples of the non-transitory computer-readable media include magnetic recording media (for example, flexible disk, magnetic tape, and hard disk drive) and magneto-optical recording media (for example, magneto-optical disk). Furthermore, the examples of the non-transitory computer-readable media include a CD-ROM (Read Only Memory), a CD-R, and a CD-R/W. Furthermore, the examples of the non-transitory computer-readable media include semiconductor memories. The semiconductor memories include, for example, a mask ROM, a PROM (Programmable ROM), an EPROM (Erasable PROM), a flash ROM, and a RAM (Random Access Memory). The program may be supplied to the relay devices 20 and 60 by various types of transitory computer-readable media. Examples of the transitory computer-readable media include an electric signal, an optical signal, and an electromagnetic wave. The transitory computer-readable media can supply the program to the relay devices 20 and 60 via a wired communication path, such as an electric wire or an optical fiber, or a wireless communication path.

Figure 7:
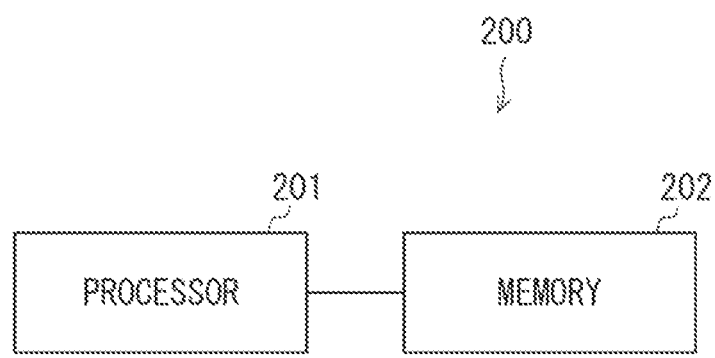
FIG. 7 is a diagram showing a hardware configuration example of a control device.

FIG. 7 is a diagram showing a hardware configuration example of a control device. In FIG. 7, a control device 200 includes a processor 201 and a memory 202. The processor 201 may be, for example, a microprocessor, an MPU (Micro Processing Unit), or a CPU (Central Processing Unit). The processor 201 may include a plurality of processors. The memory 202 is composed of a combination of a volatile memory and a nonvolatile memory. The memory 202 may include a storage disposed away from the processor 201. In this case, the processor 201 may access the memory 202 via an I/O interface (not shown). Although showing is omitted in FIG. 7, the control device 200 includes a communication interface (not shown) for communicating with a relay device.

The control devices 10, 40, and 50 of the first example embodiment to the fourth example embodiment can each have a hardware configuration shown in FIG. 7. The control unit 11 and the change units 12, 41, and 51 of the control devices 10, 40, and 50 of the first example embodiment to the fourth example embodiment may be implemented by the processor 201 reading and executing a program stored in the memory 202. The program can be stored using various types of non-transitory computer-readable media and supplied to the control devices 10, 40, and 50. Examples of the non-transitory computer-readable media include magnetic recording media (for example, flexible disk, magnetic tape, and hard disk drive) and magneto-optical recording media (for example, magneto-optical disk). Furthermore, the examples of the non-transitory computer-readable media include a CD-ROM (Read Only Memory), a CD-R, and a CD-R/W. Furthermore, the examples of the non-transitory computer-readable media include semiconductor memories. The semiconductor memories include, for example, a mask ROM, a PROM (Programmable ROM), an EPROM (Erasable PROM), a flash ROM, and a RAM (Random Access Memory). The program may be supplied to the control devices 10, 40, and 50 by various types of transitory computer-readable media. Examples of the transitory computer-readable media include an electric signal, an optical signal, and an electromagnetic wave. The transitory computer-readable media can supply the program to the control devices 10, 40, and 50 via a wired communication path, such as an electric wire or an optical fiber, or a wireless communication path.

Although the invention of the present application has been described above with reference to the example embodiments, the invention of the present application is not limited by the above. Various changes that can be understood by those skilled in the art can be made within the scope of the invention for the configurations and details of the invention of the present application.

Part or all of the above example embodiments can be written like the following supplementary note, but not limited to the following.

Supplementary Note 1

A control system configured to control a device to be controlled, comprising:
  a control device configured to control the device to be controlled by forming and transmitting a control signal for the device to be controlled; and
  a relay device configured to transfer the transmitted control signal to the device to be controlled, wherein the relay device includes:
    a plurality of communication means that differ from each other in at least one of a communication method and a communication channel;
    a communication control means for selecting, when a current use set including some communication means among the plurality of communication means is being used to transfer the control signal, a planned switching set including some other communication means among the plurality of communication means from the plurality of communication means according to switching policy;
    a prediction means for predicting a prediction communication characteristic of the planned switching set; and
    a notification means for notifying the control device of the predicted prediction communication characteristic, and
  the control device includes:
    a control means for performing control for the device to be controlled based on a control parameter value; and
    a change means for changing the control parameter value based on the notified prediction communication characteristic.

Supplementary Note 2

The control system according to Supplementary note 1, wherein
  the notification means further notifies the control device of a current communication characteristic of the current use set, and
  the change means updates the control parameter value based on the notified prediction communication characteristic and the notified current communication characteristic.

Supplementary Note 3

The control system according to Supplementary note 2, wherein the change means calculates a difference between the prediction communication characteristic and the current communication characteristic, and switches control policy including a change method of the control parameter value depending on whether the calculated difference is larger than a threshold value or the calculated difference is equal to or less than the threshold value.

Supplementary Note 4

The control system according to any one of Supplementary notes 1 to 3, wherein
  the notification means further notifies the control device of scheduled switching timing, and
  the control device further includes a negotiation means for transmitting an instruction signal including information indicating advisability of switching from the current use set to the planned switching set in the relay device and switching execution timing when switching is advisable to the relay device.

Supplementary Note 5

The control system according to Supplementary note 4, wherein the communication control means avoids switching from the current use set to the planned switching set when the instruction signal includes information indicating that switching is inadvisable, while the communication control means executes switching in accordance with the switching execution timing when the instruction signal includes information indicating that switching is advisable and information indicating the switching execution timing.

Supplementary Note 6

The control system according to any one of Supplementary notes 1 to 5, wherein the relay device further includes a virtual communication means for using a virtual MAC address that bundles the plurality of communication means to establish a link with the device to be controlled.

Supplementary Note 7

The control system according to any one of Supplementary notes 1 to 6, wherein the communication method includes at least one of a wireless LAN communication method, an LTE (Long Term Evolution) communication method, and a fifth generation communication method.

Supplementary Note 8

A relay device configured to relay a control signal for a device to be controlled transmitted from a control device, the relay device comprising:
  a plurality of communication means that differ from each other in at least one of a communication method and a communication channel;
  a communication control means for selecting, when a current use set including some communication means among the plurality of communication means is being used to transfer the control signal, a planned switching set including some other communication means among the plurality of communication means from the plurality of communication means according to switching policy;
  a prediction means for predicting a prediction communication characteristic of the planned switching set; and
  a notification means for notifying the control device of the predicted prediction communication characteristic.

Supplementary Note 9

A control device configured to control a device to be controlled by forming and transmitting a control signal for the device to be controlled, wherein
  the transmitted control signal is relayed by a relay device to the device to be controlled, wherein
  the relay device includes a plurality of communication means that differ from each other in at least one of a communication method and a communication channel, a communication control means for selecting, when a current use set including some communication means among the plurality of communication means is being used to transfer the control signal, a planned switching set including some other communication means among the plurality of communication means from the plurality of communication means according to switching policy, a prediction means for predicting a prediction communication characteristic of the planned switching set, and a notification means for notifying the control device of the predicted prediction communication characteristic,
  the control device comprising:
    a control means for performing control for the device to be controlled based on a control parameter value; and a change means for changing the control parameter value based on the notified prediction communication characteristic.

Supplementary Note 10

The control device according to Supplementary note 9, wherein
the notification means further notifies the control device of a current communication characteristic of the current use set, and
the change means updates the control parameter value based on the notified prediction communication characteristic and the notified current communication characteristic.

Supplementary Note 11

The control device according to Supplementary note 9 or 10, wherein
the notification means further notifies the control device of scheduled switching timing, and
the control device further includes a negotiation means for transmitting an instruction signal including information indicating advisability of switching from the current use set to the planned switching set in the relay device and switching execution timing when the switching is advisable to the relay device.

Supplementary Note 10

A control method performed by a relay device configured to relay a control signal for a device to be controlled transmitted from a control device, the control method comprising:
when a current use set including some communication means among a plurality of communication means that differ from each other in at least one of a communication method and a communication channel is being used to transfer the control signal, selecting a planned switching set including some other communication means among the plurality of communication means from the plurality of communication means according to switching policy;
predicting a prediction communication characteristic of the planned switching set; and
notifying the control device of the predicted prediction communication characteristic.

Supplementary Note 13

A control method performed by a control device configured to control a device to be controlled by forming and transmitting a control signal for the device to be controlled, wherein
the transmitted control signal is relayed by a relay device to the device to be controlled, wherein
the relay device includes a plurality of communication means that differ from each other in at least one of a communication method and a communication channel, a communication control means for selecting, when a current use set including some communication means among the plurality of communication means is being used to transfer the control signal, a planned switching set including some other communication means among the plurality of communication means from the plurality of communication means according to switching policy, a prediction means for predicting a prediction communication characteristic of the planned switching set, and a notification means for notifying the control device of the predicted prediction communication characteristic,
the control method comprising:
performing control for the device to be controlled based on a control parameter value; and
changing the control parameter value based on the notified prediction communication characteristic.

Supplementary Note 14

A control program causing a relay device configured to relay a control signal for a device to be controlled transmitted from a control device to perform processes of:
when a current use set including some communication means among a plurality of communication means that differ from each other in at least one of a communication method and a communication channel is being used to transfer the control signal, selecting a planned switching set including some other communication means among the plurality of communication means from the plurality of communication means according to switching policy;
predicting a prediction communication characteristic of the planned switching set; and
notifying the control device of the predicted prediction communication characteristic.

Supplementary Note 15

A non-transitory computer-readable medium configured to store a control program configured to cause a control device configured to control a device to be controlled by forming and transmitting a control signal for the device to be controlled to perform processes, wherein
the transmitted control signal is relayed by a relay device to the device to be controlled, wherein
the relay device includes a plurality of communication means that differ from each other in at least one of a communication method and a communication channel, a communication control means for selecting, when a current use set including some communication means among the plurality of communication means is being used to transfer the control signal, a planned switching set including some other communication means among the plurality of communication means from the plurality of communication means according to switching policy, a prediction means for predicting a prediction communication characteristic of the planned switching set, and a notification means for notifying
the control device of the predicted prediction communication characteristic, the control program causing the control device to perform processes including:
performing control for the device to be controlled based on a control parameter value, and
changing the control parameter value based on the notified prediction communication characteristic.

This application claims priority based on Japanese Patent Application No. 2019-052505 filed on Mar. 20, 2019, and incorporates all of its disclosure herein.

REFERENCE SIGNS LIST

1 Control system
2 Control system
3 Control system
4 Control system
10 Control device
11 Control unit
12 Change unit
13 Negotiation unit
20 Relay device
21 Communication unit
22 Communication unit
23 Communication control unit
24 Prediction unit
25 Notification unit 30 Device to be controlled
40 Control device
41 Change unit
50 Control device
51 Change unit
60 Relay device
61 Communication unit
62 Virtual communication unit
63 Measurement unit
64 Notification unit
70 Reliable communication device
80 Reliable communication device
81 Communication unit
83 Communication control unit

What is claimed is:

1. A control system comprising:
a control device configured to control a target device by generating and transmitting a control signal for the target device specifically and not for any other target devices; and
a relay device configured to transfer the transmitted control signal to the target device specifically to the target device and not to any other target devices, wherein
the relay device includes:
a plurality of communication units that differ from each other by either or both of a communication method and a communication channel;
first hardware including at least one first processor and at least one first memory storing first instructions executable by the at least one first processor to:
select, when a current use set of those of the communication units is currently being used to transfer the control signal specifically to the target device and not to any other target devices, a planned switching set of other of the communication units that are not currently being used to transfer the control signal, according to a switching policy, the planned switching set being a set of the other of the communication units that are to be subsequently used to transfer the control signal specifically to the target device and not to any other target devices;
predict a prediction communication characteristic of the planned switching set; and
notify the control device of the predicted prediction communication characteristic, and
the control device includes:
second hardware including at least one second processor and at least one second memory storing second instructions executable by the at least one second processor to:
perform control for the target device based on a control parameter value; and
change the control parameter value based on the prediction communication characteristic that the control device was notified of by the relay device.

2. The control system according to claim 1, wherein
the relay device further notifies the control device of a current communication characteristic of the current use set, and
the control device updates the control parameter value based on the prediction communication characteristic and the current communication characteristic that the control device was notified of by the relay device.

3. The control system according to claim 2, wherein the control device calculates a difference between the prediction communication characteristic and the current communication characteristic, and switches a control policy including a change method of the control parameter value depending on whether the calculated difference is larger than a threshold value or is equal to or less than the threshold value.

4. The control system according to claim 1, wherein
the relay device further notifies the control device of scheduled switching timing at which the relay device switches from the current use set to the planned switching set to transfer the control signal specifically to the target device and not to any other target devices, and
the control device further transmits an instruction signal including information indicating advisability of switching from the current use set to the planned switching set in the relay device and the switching execution timing when switching is advisable, to the relay device.

5. The control system according to claim 4, wherein
the relay device avoids switching from the current use set to the planned switching set to transfer the control signal specifically to the target device and not to any other target devices when the instruction signal includes information indicating that switching is inadvisable, and
the relay device executes switching from the current use set to the planned switching set to transfer the control signal specifically to the target device and not to any other target devices, in accordance with the switching execution timing, when the instruction signal includes information indicating that switching is advisable and information indicating the switching execution timing.

6. The control system according to claim 1, wherein the relay device further includes a virtual communication unit implemented at least by the first hardware and that uses a virtual MAC address that bundles the plurality of communication units to establish a link with the target device.

7. The control system according to claim 1, wherein the communication method includes at least one of a wireless LAN communication method, an LTE (Long Term Evolution) communication method, and a fifth generation communication method.

8. A relay device configured to relay a control signal for a target device specifically and not for any other target device transmitted from a control device to the target device specifically and not to any other target device, the relay device comprising:
a plurality of communication units that differ from each other by either or both of a communication method and a communication channel;
hardware including at least one processor and at least one memory storing instructions executable by the at least one processor to;
select, when a current use set of those of the communication units is currently being used to transfer the control signal specifically to the target device and not to any other target devices, a planned switching set of other of the communication units that are not currently being used to transfer the control signal, according to a switching policy, the planned switching set being a set of the other of the communication units that are to be subsequently used to transfer the control signal specifically to the target device and not to any other target devices;
predict a prediction communication characteristic of the planned switching set; and
notify the control device of the predicted prediction communication characteristic.

9. A control device configured to control a target device to be controlled by forming and transmitting a control signal for the device to be controlled a target device by generating and transmitting a control signal for the target device specifically and not for any other target devices, wherein
the transmitted control signal is relayed by a relay device to the target device specifically to the target device and not to any other target devices, wherein
the relay device includes:
a plurality of communication units that differ from each other by either or both of a communication method and a communication channel;
first hardware first hardware including at least one first processor and at least one first memory storing first instructions executable by the at least one first processor to:
select, when a current use set of those of the communication units is currently being used to transfer the control signal specifically to the target device and not to any other target devices, a planned switching set of other of the communication units that are not currently being used to transfer the control signal, according to a switching policy, the planned switching set being a set of the other of the communication units that are to be subsequently used to transfer the control signal specifically to the target device and not to any other target devices;
predict a prediction communication characteristic of the planned switching set; and
notify the control device of the predicted prediction communication characteristic,
the control device includes:
second hardware including at least one second processor and at least one second memory storing second instructions executable by the at least one second processor to:
perform control for the target device based on a control parameter value; and
change the control parameter value based on the prediction communication characteristic that the control device was notified of by the relay device.

10. The control device according to claim 9, wherein
the relay device further notifies the control device of a current communication characteristic of the current use set, and
the control device updates the control parameter value based on the prediction communication characteristic and the current communication characteristic that the control device was notified of by the relay device.

11. The control device according to claim 9, wherein
the relay device further notifies the control device of scheduled switching timing at which the relay device switches from the current use set to the planned switching set to transfer the control signal specifically to the target device and not to any other target devices, and
the control device further transmits an instruction signal including information indicating advisability of switching from the current use set to the planned switching set in the relay device and the switching execution timing when switching is advisable, to the relay device.

* * * * *